(12) United States Patent
Lee

(10) Patent No.: US 12,158,997 B2
(45) Date of Patent: Dec. 3, 2024

(54) COMPUTER MOUSE

(71) Applicant: Han Kiel Lee, Seoul (KR)

(72) Inventor: Han Kiel Lee, Seoul (KR)

(73) Assignee: Han Kiel Lee (KR)

( * ) Notice: Subject to any disclaimer, the term of this patent is extended or adjusted under 35 U.S.C. 154(b) by 0 days.

(21) Appl. No.: 18/261,676

(22) PCT Filed: May 17, 2021

(86) PCT No.: PCT/KR2021/006118
§ 371 (c)(1),
(2) Date: Jul. 17, 2023

(87) PCT Pub. No.: WO2022/158657
PCT Pub. Date: Jul. 28, 2022

(65) Prior Publication Data
US 2024/0319802 A1 Sep. 26, 2024

(30) Foreign Application Priority Data

Jan. 20, 2021 (KR) .......... 10-2021-0007931
Jan. 20, 2021 (KR) .......... 10-2021-0007932

(51) Int. Cl.
*G06F 3/0354* (2013.01)
*G06F 3/0362* (2013.01)
(52) U.S. Cl.
CPC ........ *G06F 3/03543* (2013.01); *G06F 3/0362* (2013.01)

(58) Field of Classification Search
CPC .................. G06F 3/03543; G06F 3/0362
See application file for complete search history.

(56) References Cited

U.S. PATENT DOCUMENTS

| | | | | |
|---|---|---|---|---|
| 4,917,516 A * | 4/1990 | Retter | ........... | G06F 3/03543 400/489 |
| 5,260,696 A * | 11/1993 | Maynard, Jr. | ........... | G06F 3/039 345/157 |
| 5,870,081 A * | 2/1999 | Wu | ........... | G06F 3/03543 345/163 |
| 6,205,021 B1 * | 3/2001 | Klein | ........... | G06F 3/03547 D14/320 |
| 6,304,249 B1 * | 10/2001 | Derocher | ........... | G06F 3/03543 248/118.1 |
| 6,417,843 B1 * | 7/2002 | Stephens | ........... | G06F 3/03543 248/118.1 |
| 6,433,779 B1 * | 8/2002 | Woolman | ........... | G06F 3/039 341/20 |

(Continued)

*Primary Examiner* — Benyam Ketema

(57) ABSTRACT

Disclosed is a computer mouse that may be changed in size and shape. According to an embodiment, the computer mouse includes a first driving unit moving a cover in the front and rear direction to perform an up-and-down operation, a second driving unit moving a plurality of buttons in the left and right direction to perform an open-and-close operation, a sub-button moving the cover backward to raise the cover and at the same time is drawn out to both sides of the body or is drawn into the body when the cover is moved forward, and a third driving unit causing the sub-button to appear and disappear. In addition, a computer mouse that is easy to carry is disclosed. According to an embodiment, the computer mouse includes a mouse body, and a cover member detachably coupled to the mouse body.

2 Claims, 17 Drawing Sheets

(56) References Cited

U.S. PATENT DOCUMENTS

| | | | | |
|---|---|---|---|---|
| 6,590,563 B1* | 7/2003 | Oross | G06F 3/039 | 345/157 |
| 6,690,359 B1* | 2/2004 | Felton | G06F 3/03543 | 345/157 |
| 7,233,319 B2* | 6/2007 | Johnson | G06F 3/038 | 345/166 |
| 10,025,397 B1* | 7/2018 | Lai | H01H 9/08 | |
| 10,095,321 B1* | 10/2018 | Lu | G06F 3/03543 | |
| 10,592,008 B1* | 3/2020 | Wang | G06F 3/0346 | |
| 2002/0167482 A1* | 11/2002 | Yin | G06F 1/1616 | 345/156 |
| 2003/0214484 A1* | 11/2003 | Haywood | G06F 3/0338 | 345/163 |
| 2004/0183502 A1* | 9/2004 | Cheng | G06F 3/03543 | 320/108 |
| 2004/0201574 A1* | 10/2004 | Wei | G06F 3/039 | 345/163 |
| 2005/0110760 A1* | 5/2005 | Huang | G06F 3/039 | 345/163 |
| 2005/0116933 A1* | 6/2005 | Huang | G06F 3/03545 | 345/163 |
| 2005/0116934 A1* | 6/2005 | Yin | G06F 3/03543 | 345/163 |
| 2005/0146500 A1* | 7/2005 | Cheng | H01H 25/04 | 345/163 |
| 2006/0007151 A1* | 1/2006 | Ram | G06F 3/0383 | 345/163 |
| 2006/0097120 A1* | 5/2006 | Chang | G06F 3/039 | 248/311.2 |
| 2006/0244726 A1* | 11/2006 | Wang | G06F 3/03543 | 345/163 |
| 2006/0274042 A1* | 12/2006 | Krah | G06F 3/03543 | 345/163 |
| 2007/0132733 A1* | 6/2007 | Ram | G06F 3/03544 | 345/163 |
| 2008/0246727 A1* | 10/2008 | Larsen | G06F 3/03543 | 345/163 |
| 2010/0045604 A1* | 2/2010 | Kim | G06F 1/1616 | 345/163 |
| 2011/0043450 A1* | 2/2011 | Chou | G06F 3/03543 | 345/163 |
| 2012/0044145 A1* | 2/2012 | Kim | G06F 3/0338 | 345/163 |
| 2016/0109963 A1* | 4/2016 | Li | G06F 3/03543 | 345/163 |
| 2017/0205879 A1* | 7/2017 | Joseph | G06F 3/03544 | |
| 2017/0300137 A1* | 10/2017 | Chen | G06F 3/03543 | |
| 2020/0379582 A1* | 12/2020 | Zeng | G06F 3/03543 | |
| 2022/0011873 A1* | 1/2022 | Kauh | G06F 3/0362 | |
| 2023/0376127 A1* | 11/2023 | Helmes | G06F 3/0362 | |

\* cited by examiner

COMPUTER MOUSE

TECHNICAL FIELD

The present invention relates to a computer mouse, and more particularly to, a computer mouse that is changed in size and shape to suit the purpose or preferred size of each individual, is easy to carry, and has a beautiful and luxurious appearance.

BACKGROUND ART

A mouse, which is one of input devices of a computer, is formed in a small size so as to fit in the hand while forming a convex shape that is easy to hold with the hand.

The mouse is connected to a computer body by wired or wirelessly, a plurality of buttons are formed to move (input) a cursor on a screen, and a wheel is provided between these buttons.

The mouse is formed convexly upward so as to be comfortable to hold while wrapping the hand around the mouse, and is used by putting the palm lightly on an upper surface of the mouse and by holding both sides with the thumb and little finger.

In general, since a computer mouse is constantly exposed to the outside, contamination is concerned and there is a risk of damage due to impact.

In addition, since the computer mouse according to the prior art is usually treated as an inexpensive consumable, it is usually manufactured of a low-cost material made of synthetic resin, and thus, there was a disadvantage in failing to satisfy the needs of consumers who want a luxurious image.

In addition, since the computer mouse according to the prior art has a fixed size, it was inconvenient for a person with a large hand to use it because a grip portion is small, and additional buttons that may more cover functions such as DPI and backspace were needed.

OBJECT OF THE INVENTION

It is an object of the present invention to provide a computer mouse that is used in a normal type size, may be used comfortably by a person with big hands by increasing the width and height of a grip portion if necessary, may be changed in the size and shape so as to be optimized for long-term detailed work, may operate noiselessly in a casual mode, and may operate noisily in a professional mode.

It is another object of the present invention to provide a computer mouse that is easy to carry and includes a cover made of a luxurious material to protect a button portion from external impact and to have a beautiful appearance, the cover being electrically connected to a body to enable signal transmission and reception and power supply.

Technical Solution

To accomplish the above-mentioned objects, according to an aspect of the present invention, there is provided a computer mouse including a mouse body having a plurality of buttons on an upper portion and a scroll wheel formed between the plurality of buttons, and formed in an upwardly convex shape, wherein the mouse body includes a support unit including a plate formed on a lower portion and a cover formed on an upper portion, having a space formed inside, and formed in the middle of the space, a first driving unit moving the cover in a front and rear direction to perform an up-and-down operation, a second driving unit moving the plurality of buttons in a left and right direction to perform an open-and-close operation, a sub-button moving the cover backward to raise the cover and at the same time, drawn out to both sides of a body or drawn into the body when the cover is moved forward, and a third driving unit causing the sub-button to appear and disappear.

The support unit may include a plate member placed on an upper portion of the plate and having rack gears formed on both sides of an upper surface, and a box portion protruding from an upper portion of the plate member, a liquid crystal display unit may be formed on an upper surface of the box portion, a plurality of setting switches may be formed, and the plurality of setting switches may set functions of DPI, lighting color of an LED, and a sub-button.

A scroll wheel may be formed in front of the box portion.

The first driving unit may include an operation axis having an upper end hinged to a bottom surface of the cover and a lower end hinged to a protrusion formed on an upper surface of the plate; and a rotating portion including a boss protruding from the upper surface of the plate, a shaft coupled to the boss, a main gear coupled to the shaft, a rack gear formed on an upper surface of the support unit in a longitudinal direction so as to be geared to the main gear, a first pulley formed on a lower hinge axis of the operation axis, a second pulley formed on the shaft, and a belt connecting the first pulley to the second pulley.

The second driving unit may include a horizontal plate formed on a lower portion of the button and having a slide long hole formed; and a link having one end fitted to a first axis pin formed in front of the support unit, the other end fitted to a second axis pin inserted into the long slide hole of the horizontal plate, and having a long hole formed to guide driving of the first axis pin.

The third driving unit may include a connection bar formed on a side surface of the support unit and having a groove in which a boss and a protrusion of the plate are accommodated; a side link bar having one end hinged to the connection bar and having a slide groove formed to have a length; and a side bar hinged to the other end of the side link bar, and the sub-button may be coupled to the side bar.

The computer mouse according may include a folding unit rotating the sub-button to fold the sub-button in an up and down direction, and the folding unit may include a rod having one end inserted into the slide groove of the side link bar to be movable, and the other end hinged to the side bar; a slider coupled to a long hole formed in the side bar in the longitudinal direction and to which the other end of the rod is hinged; and an induction link having a long hole of which one end is fitted to an axis pin protruding from an upper surface of the slider, and the other end is hinged to the side bar.

To accomplish the above-mentioned objects, according to another aspect of the present invention, there is provided a computer mouse that is easy to carry including a mouse body and a cover member detachably coupled to the mouse body, wherein, in the cover member, a panel portion is formed on an upper portion, a side wall is formed on a lower portion of the panel portion, and an insertion groove into which an upper portion of the mouse body is inserted is formed concavely on a lower surface, a magnetic body is formed on the panel portion, an edge portion magnetically attached to the magnetic body is formed on an outer circumferential surface of the mouse body so that the cover member may be coupled to the edge portion by magnetic attachment, a first terminal unit is formed in the panel portion, a second terminal unit in contact with the first terminal unit is formed in the lower portion of the mouse body so that a sensor signal and power are supplied.

In the cover member, a sensor may be formed in an inner circumferential surface of an insertion groove, a power supply unit may be formed inside, the sensor and the first terminal unit may be electrically connected so that a signal read from the sensor is transmitted to the first terminal unit.

The mouse body may include a plurality of buttons and a body mounted on an upper portion, formed in an arc shape, and made of stainless or aluminum, a touch-responsive wheel may be formed between the plurality of buttons, a convex protrusion may be formed in the first terminal unit, and the second terminal unit may be formed as a concave recessed portion.

Advantageous Effects of the Invention

According to the present invention, the computer mouse is used in the normal type size, may be used comfortably by a person with big hands by increasing the width and height of the grip portion if necessary, may be optimized for long-term detailed work through a shape change, may operate noiselessly in the casual mode, and may operate noisily in the professional mode, and thus, there is an effect that the deformation may be freely applied according to a place or a user's mood.

According to the present invention, the computer mouse is easy to carry and provides the cover made of a luxurious material to protect the mouse body and the button portion from external impact and the mouse body, and thus, there is an effect of having a beautiful appearance.

EXPLANATION OF REFERENCE NUMERALS

Figure 1:
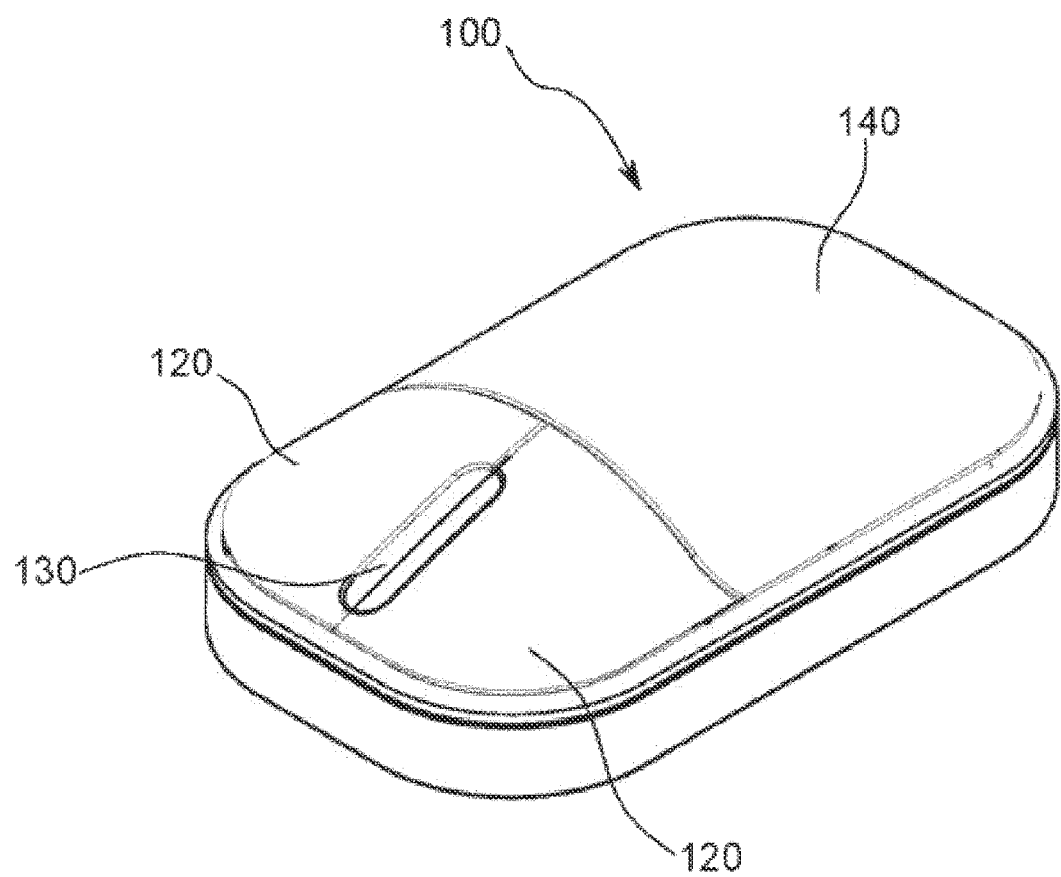
FIG. 1 is a perspective view showing a casual mode of a computer mouse according to the present invention.

100: mouse body 120: button
130: scroll wheel 140: cover
150: second terminal unit 160: plate
170: support unit 173: rack gear
174: first pulley 176: second pulley
175: belt 180: sub-button
200: cover member 220: panel portion
240: side wall 290: insertion groove
225: pad M: magnetic body
260: first terminal unit 270: sensor
280: power supply unit 300: first driving unit
310: operation axis 320: boss
330: shaft 340: main gear
400: second driving unit 420: horizontal plate
440: link 500: third driving unit
520: connection bar 540: side link bar
560: side bar 580: folding unit
582: rod 584: slider
586: induction link

DESCRIPTION OF THE INVENTION

Hereinafter, embodiments will be described with reference to the accompanying drawings. However, various changes may be made to the embodiments, and thus, the scope of the patent application is not limited or restricted by these embodiments. It should be understood that all changes, equivalents or substitutes to the embodiments are included within the scope of rights.

Figure 2:
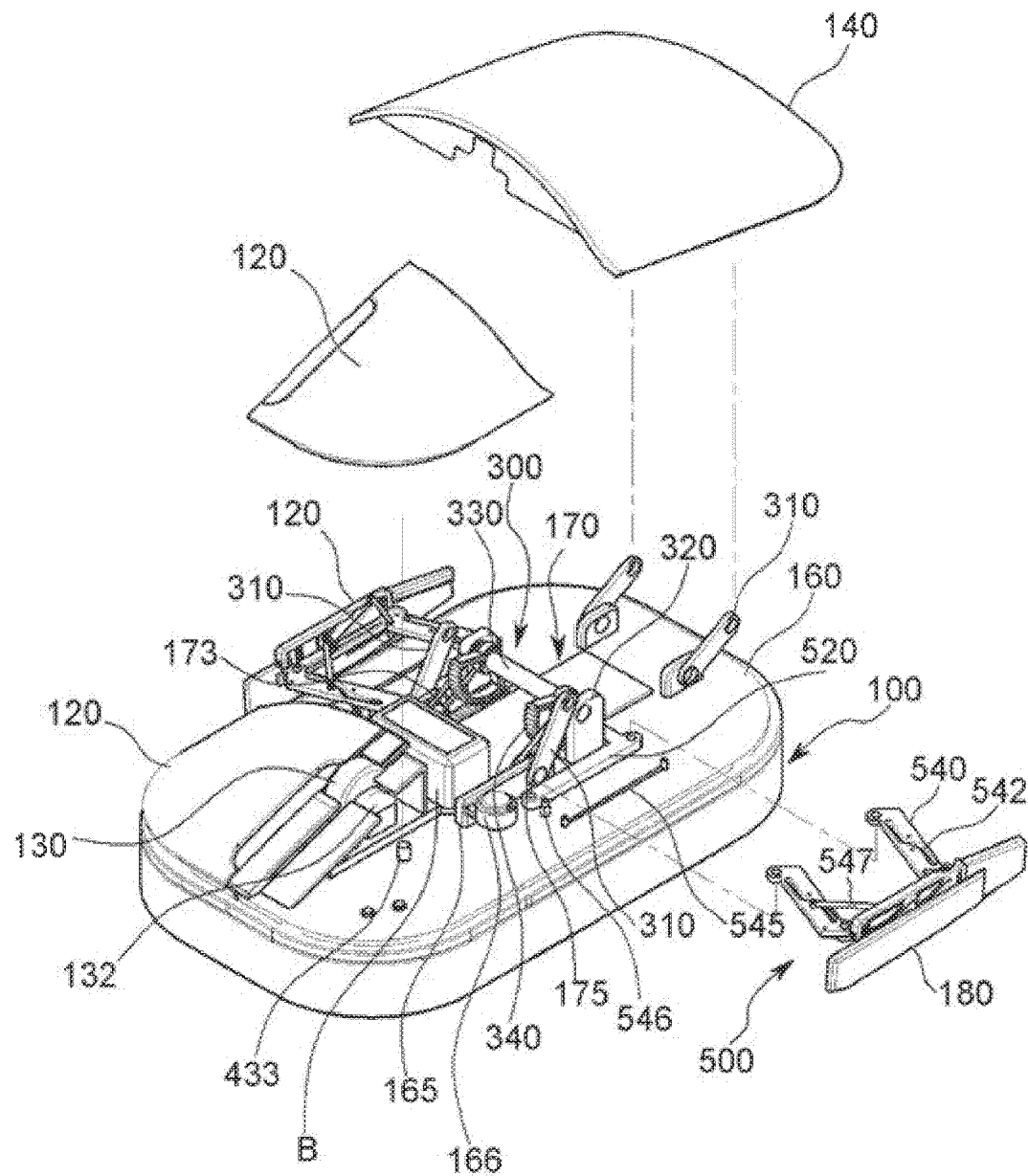
FIG. 2 is an exploded perspective view showing a computer mouse according to the present invention.
Figure 3:
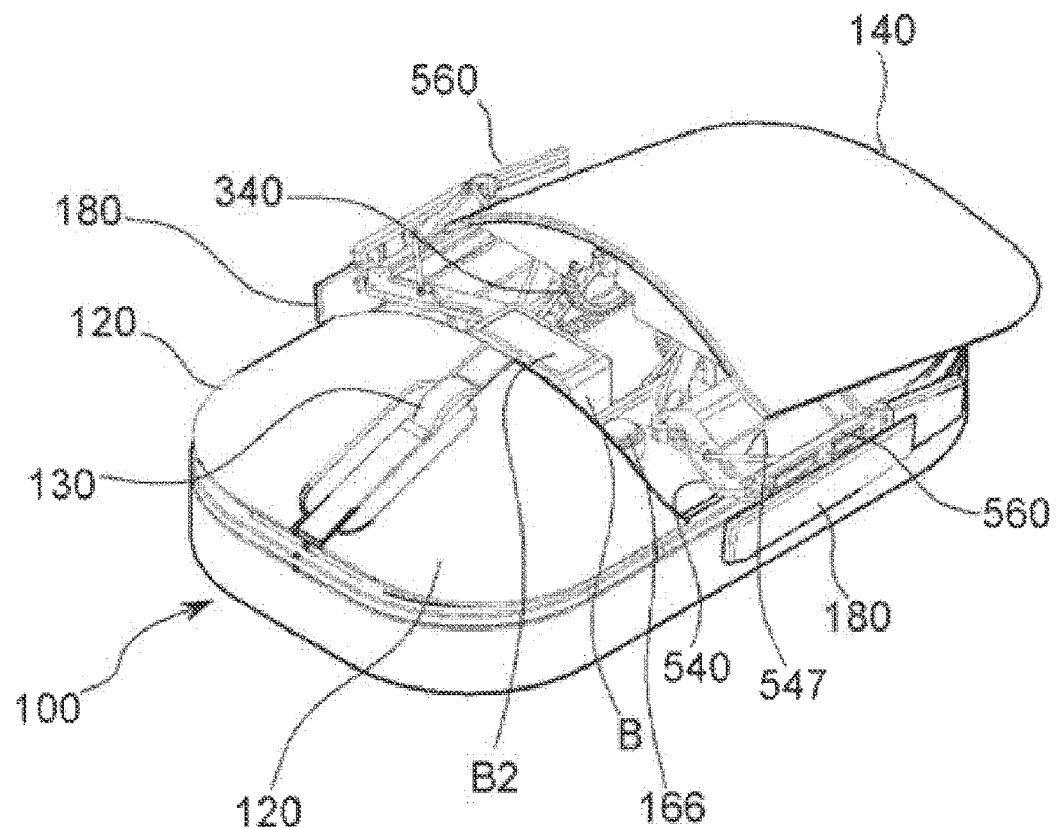
FIG. 3 is a perspective view showing a pro mode of a computer mouse according to the present invention.
Figure 4:
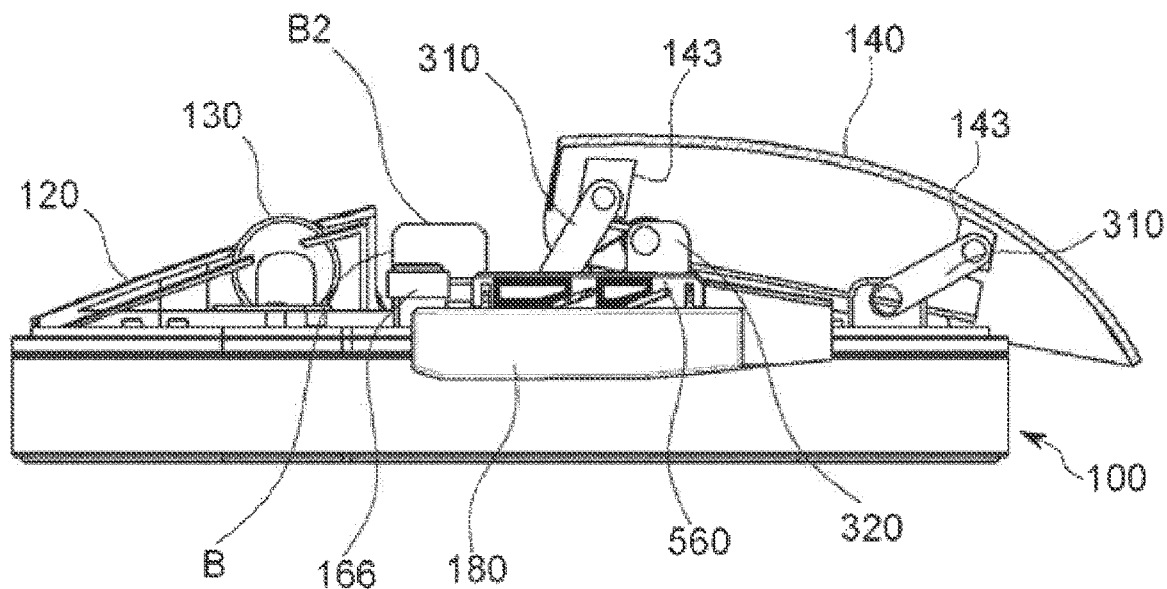
FIG. 4 is a side cross-sectional view showing a computer mouse according to the present invention.
Figure 5:
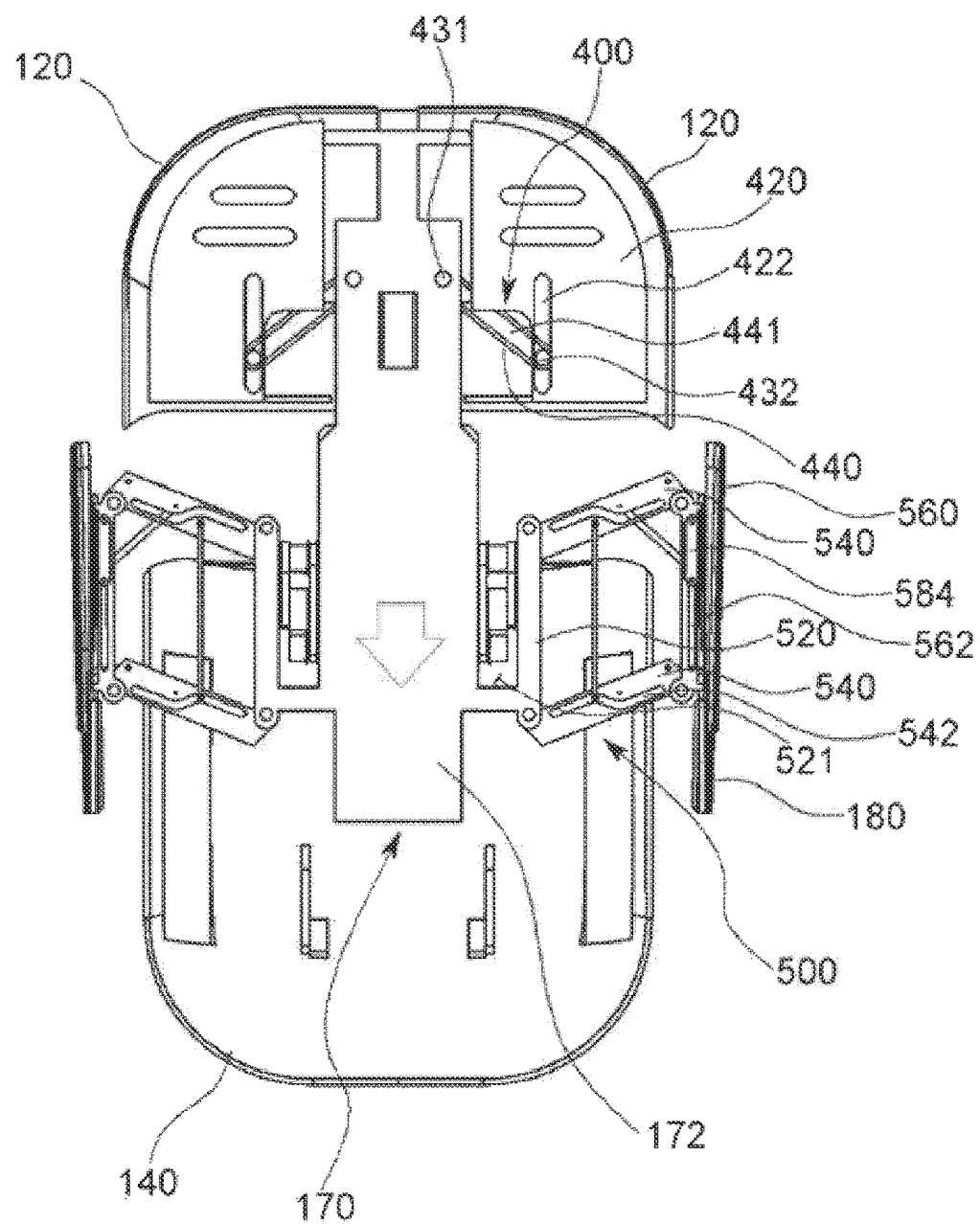
FIG. 5 is a bottom view showing the inside of a computer mouse according to the present invention.
Figure 6:
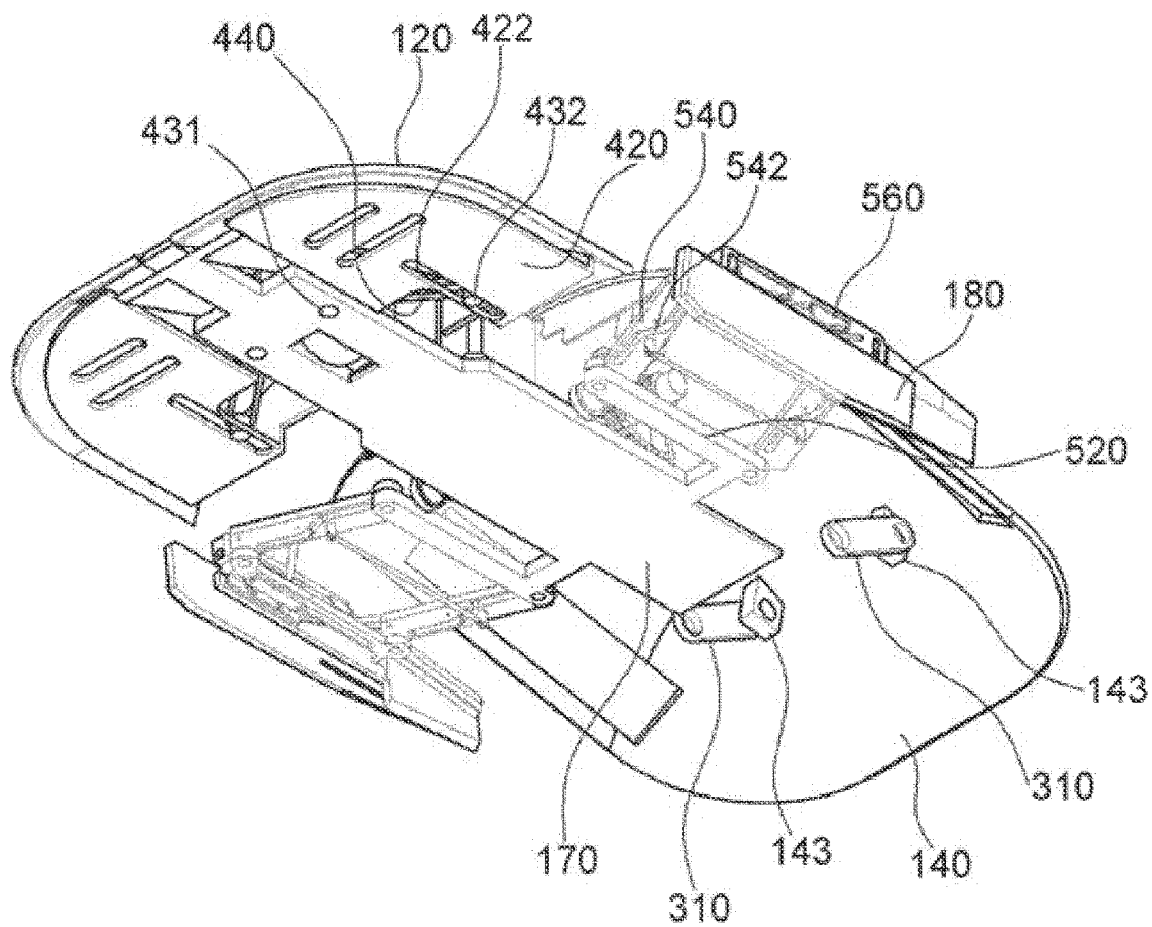
FIG. 6 is a bottom perspective view showing the inside of a computer mouse according to the present invention.
Figure 7:
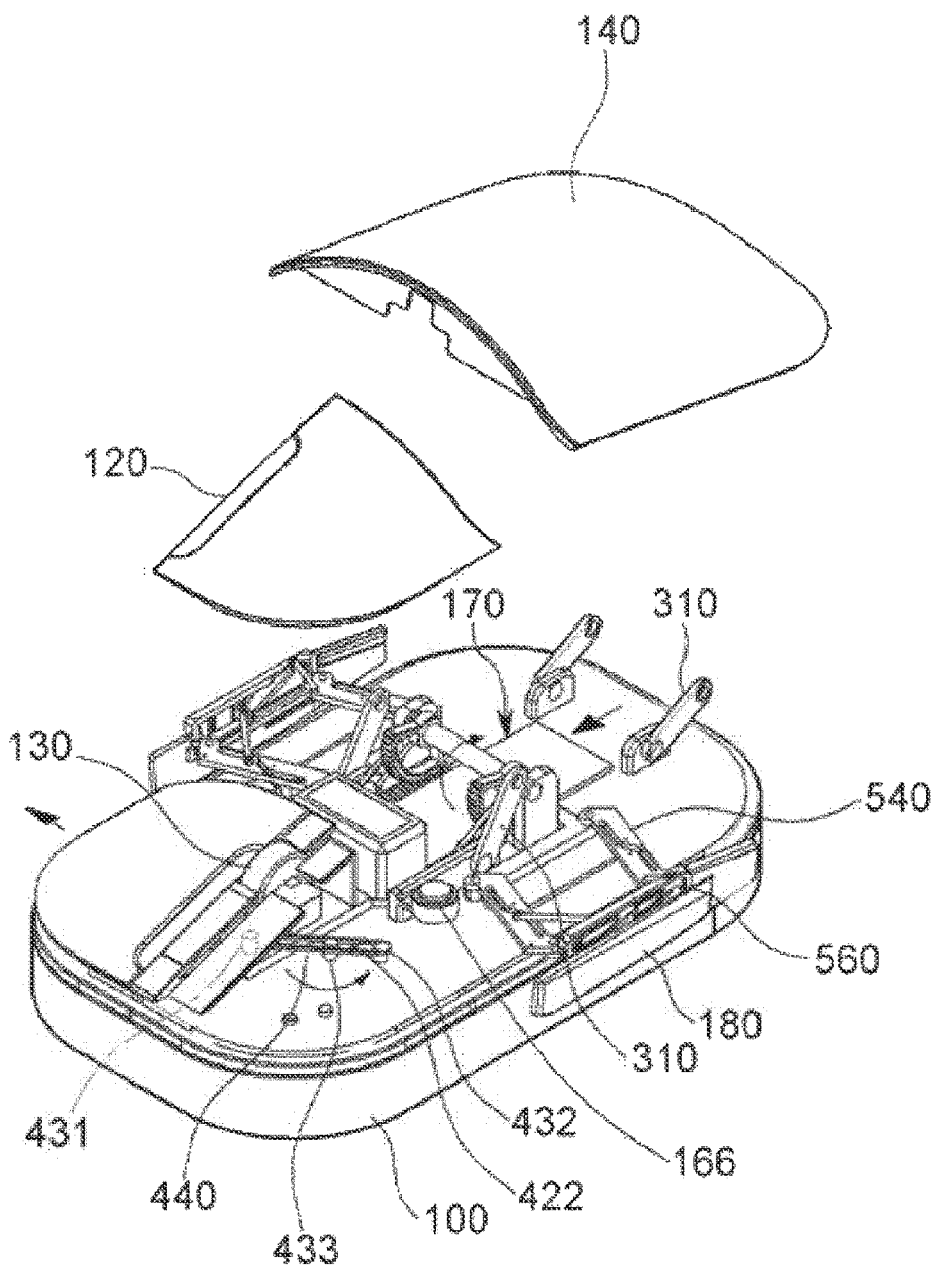
FIG. 7 is a perspective view showing the inside of a computer mouse in a pro mode according to the present invention.
Figure 8:
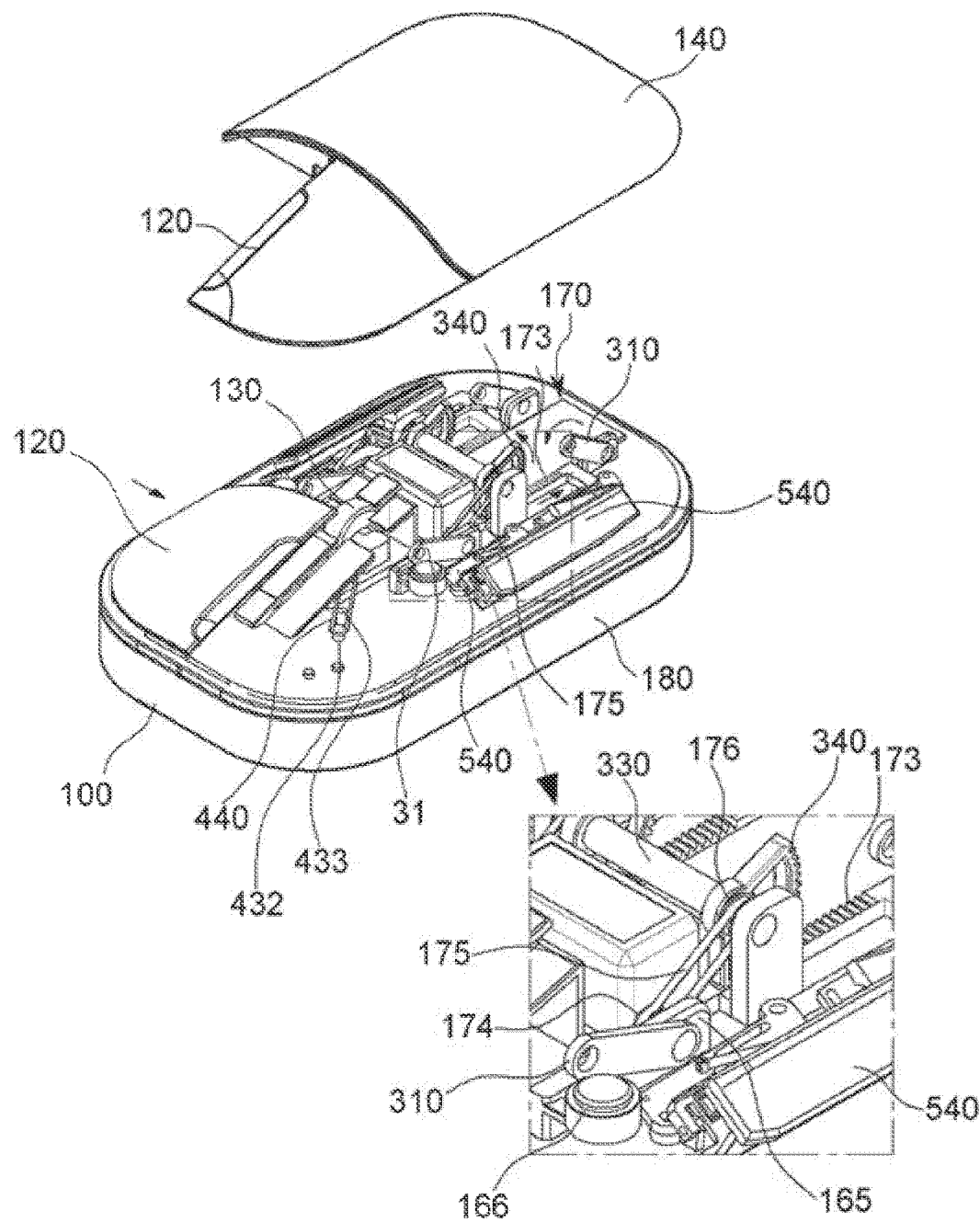
FIG. 8 is a perspective view showing the inside of a computer mouse in a casual mode according to the present invention.
Figure 9:
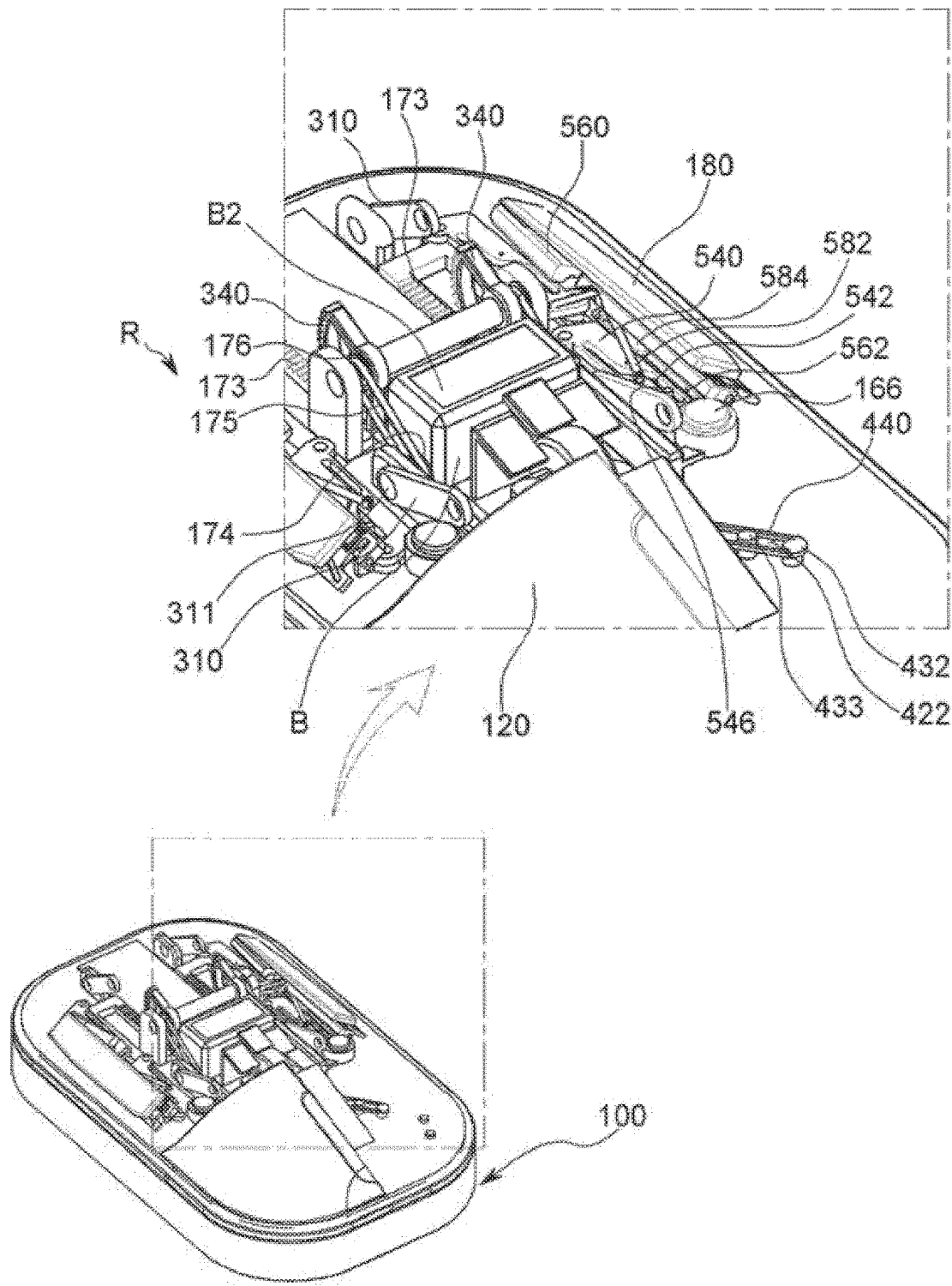
FIG. 9 is a perspective view showing a folded state of a 'third driving unit' of a computer mouse according to the present invention.
Figure 10:
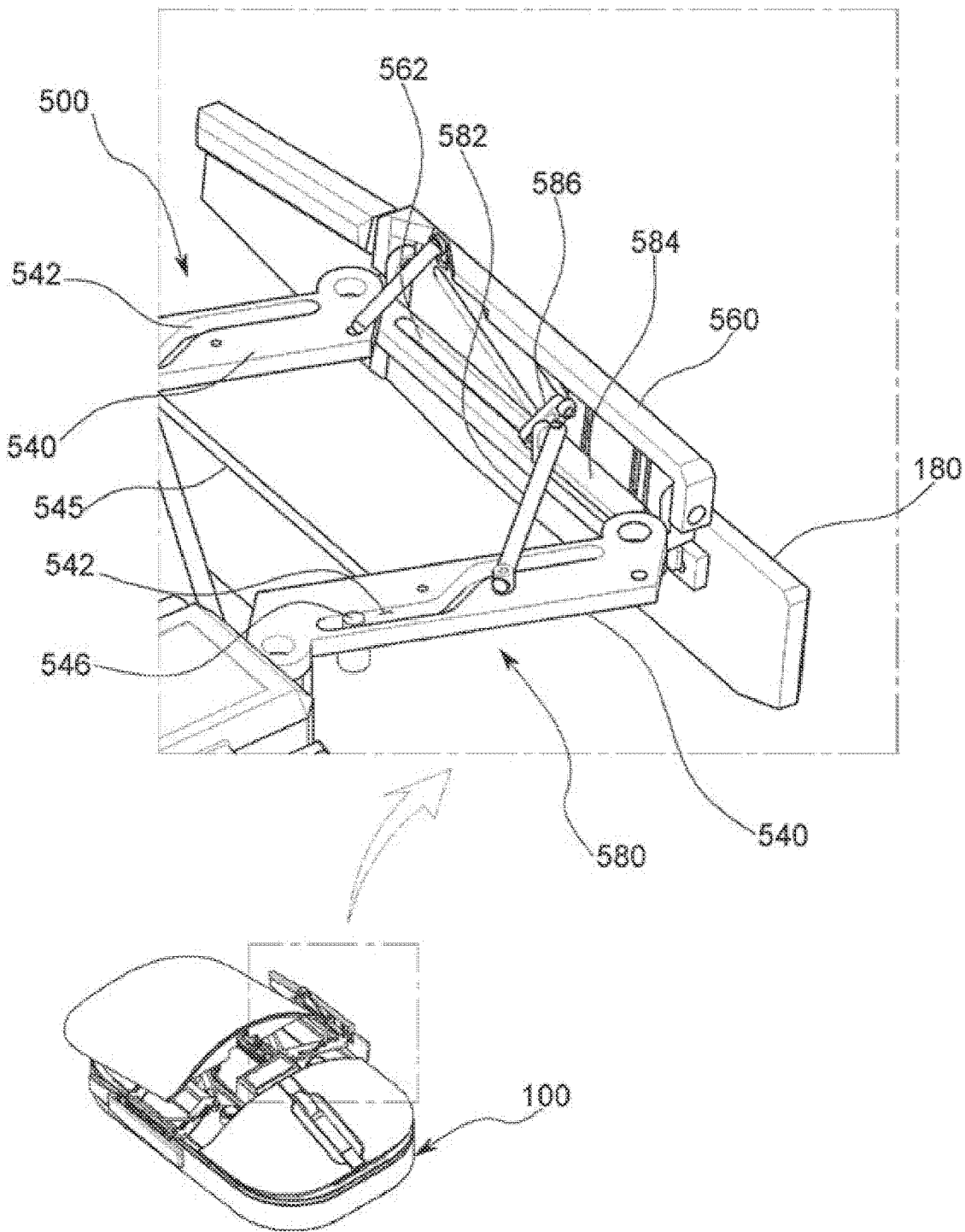
FIG. 10 and FIG. 11 are perspective views showing a deployed state of a 'third driving unit' of a computer mouse according to the present invention.

Among the accompanied drawings, FIG. 1 is a perspective view showing a casual mode of a computer mouse according to the present invention, FIG. 2 is an exploded perspective view showing the computer mouse according to the present invention, FIG. 3 is a perspective view showing a pro mode of the computer mouse according to the present invention, FIG. 4 is a side cross-sectional view showing the computer mouse according to the present invention, FIG. 5 is a bottom view showing the inside of the computer mouse according to the present invention, FIG. 6 is a bottom perspective view showing the inside of the computer mouse according to the present invention, FIG. 7 is a perspective view showing the inside of the computer mouse in a pro mode according to the present invention, FIG. 8 is a perspective view showing the inside of the computer mouse in a casual mode according to the present invention, FIG. 9 is a perspective view showing a folded state of a 'third driving unit' of the computer mouse according to the present invention, and FIG. 10 is a perspective view showing a deployed state of a 'third driving unit' of the computer mouse according to the present invention.

The computer mouse according to the present invention includes a mouse body 100 having a plurality of buttons 120 on an upper portion and a scroll wheel 130 formed between the plurality of buttons 120, and formed in an upwardly convex shape. The scroll wheel 130 may be a touch type scroll wheel. This state is referred to as a "casual mode".

In the casual mode, the front button 120 is implemented in a noiseless manner. The casual mode is applied when using in a relatively quiet place such as an office.

On the other hand, when changed to a "pro mode" to be described below, the button 120 may be implemented in a noisy manner. The pro mode is used when a relatively active movement is required, such as in a game, and may give a cheerful feeling by generating a clicking sound.

The mouse body 100 includes a support unit 170 including a plate 160 formed on a lower portion and a cover 140 formed on an upper portion, having a space formed inside, and formed in the middle of the space,
    a first driving unit 300 moving the cover 140 in the front and rear direction to perform an up-and-down operation,
    a second driving unit 400 moving the plurality of buttons 120 in the left and right direction to perform an open-and-close operation,
    a sub-button 180 moving the cover 140 backward to raise the cover 140 and at the same time, drawn out to both sides of a body 102 or drawn into the body 102 when the cover 140 is moved forward; and a third driving unit 500 causing the sub-button 180 to appear and disappear.

As for the reference to the direction described in the present invention, it should be noted that forward means the left side, and backward means the right side with reference to FIG. 1.

The support unit 170 includes a plate member 172 placed on an upper portion of the plate 160 and having rack gears 173 formed on both sides of an upper surface, and a box portion B protruding from an upper portion of the plate member 172.

A liquid crystal display unit B2 is formed on an upper surface of the box portion B, and the liquid crystal display unit B2 displays numerical values digitally.

A plurality of setting switches 166 are formed on one side of the liquid crystal display unit B2 and on the upper portion of the plate 172.

By manipulating the plurality of setting switches 166, functions of DPI, lighting, and sub-buttons are set.

In addition, the scroll wheel 130 is provided in front of the box portion B. Since the scroll wheel 130 is mechanically driven, it is coupled between the brackets 132 formed on both sides of the upper portion of the plate member 172 to be rotatable.

In addition, an LED (not shown) is configured on the upper portion of the plate 160 or the support unit 170 and is turned on when the cover 140 is opened, so that a lighting function may be added.

The first drive unit 300 performing an open-and-close operation on the cover 140 includes an operation axis 310 having an upper end hinged to a bottom surface of the cover 140 and a lower end hinged to a protrusion 165 formed on the upper surface of the plate 160; and a rotating portion R including a boss 320 protruding from the upper surface of the plate 160, a shaft 330 coupled to the boss 320, a main gear 340 coupled to the shaft 330, a rack gear 173 formed on the upper surface of the support unit 170 in a longitudinal direction so as to be geared to the main gear 340, a first pulley 174 formed on a lower hinge axis 311 of the operation axis 310, a second pulley 176 formed on the shaft 330, and a belt 175 connecting the first pulley 174 to the second pulley 176.

The operating axes 310 are provided at the front and rear, hinged to the upper surface of the plate 160, provided in pairs on both sides, and coupled to a hinge connection portion 143 formed on a bottom surface of the cover 140 with a pin (FIG. 2 and see FIG. 4).

The main gear 340 is formed in a fan shape to have an arc portion, has teeth formed in the arc portion to be geared to the rack gear 173, and has the other side coupled to the shaft 330 to be rotated integrally with the shaft 330.

Therefore, as shown in FIG. 7 or 8, when the operation axis 310 is moved forward and backward by the front and rear movement of the cover 140, since the first pulley 174 connected thereto is rotated, the belt 175 is rotated, and the second pulley 176 is rotated, the main gear 340 is rotated up and down, and the rack gear 173 geared to the main gear 340 I pushed in the front and rear direction, and thus, the support unit 170 may be moved in the front and rear direction.

Preferably, as shown in FIG. 4, when the cover 140 pulls backward and is opened, the cover 140 may be opened backward and rise by placing the left operation axis 310 at a higher position than the right operation axis 310, and thus, the height may be adjusted upward.

Meanwhile, the second driving unit 400 performing an open-and-close operation on the button 120 in the left and right direction will be described.

As shown in FIGS. 5 to 8, the second driving unit 400 includes a horizontal plate 420 formed on the lower portion of the button 120 and having a slide long hole 422 formed; and a link 440 having one end fitted to a first axis pin 431 formed in front of the support unit 170, the other end fitted to a second axis pin 432 inserted into the long slide hole 422 of the horizontal plate 420, and having a long hole 441 formed to guide the driving of the first axis pin 431.

Referring to FIG. 7, a reference pin 433 is coupled to the center of the link 440. The reference pin 433 is fixed to the plate 160, and thus, there is no change in the position.

Therefore, the link 440 rotates in the front and rear direction around the reference pin 433.

Upon describing the operation of the second driving unit 400, as shown in FIG. 8, when the support unit 170 moves backward, the first axis pin 431 is moved backward and rotates the link 440, and the second axis pin 432 connected to the link 440 is moved along the slide long hole 422 of the link 440, and thus, the second driving unit 400 operates in a direction in which the button 120 is closed.

The direction in which the button 120 is closed means an operation in which the buttons 120 on both sides are gathered together.

Conversely, as shown in FIG. 7, when the support unit 170 moves forward, the first axis pin 431 is moved forward and rotates the link 440 in a reverse direction, and the second axis pin 432 connected to the link 440 is moved in the reverse direction along the slide long hole 422 of the link 440, and thus, the second driving unit 400 operates in a direction in which the buttons 120 on both sides are opened.

Opening means an operation in which the buttons 120 on both sides are opened in opposite directions to be apart from each other so that the scroll wheel 130 is exposed.

Meanwhile, the third drive unit 500 allowing the sub-button 180 to appear and disappear will be described with reference to FIGS. 5 and 9 to 11.

The third driving unit 500 includes a connection bar 520 formed on a side surface of the support unit 170 and having a groove 521 in which the boss 320 and the protrusion 165 of the plate 160 are accommodated; a side link bar 540 having one end hinged to the connection bar 520 and having a slide groove 542 formed to have a length; a side bar 560 hinged to the other end of the side link bar 540, and the sub-button 180 is coupled to the side bar 560.

A protrusion 546 protruding from the upper surface of the plate 160 is coupled to the slide groove 542 of the side link bar 540.

Referring to FIGS. 9 and 10, while the side link bar 540 rotates along the protrusion 546, the protrusion 546 may be guided to the slide groove 542.

In addition, a link bar connecting rod 545 connecting the two side link bars 540 on both sides is provided, and thus, the two side link bars 540 may be maintained at a uniform interval without being opened or gathered each other during a rotation process.

The third driving unit 500 also includes a folding unit 580 rotating the sub-button 180 to perform a folding operation in the up and down direction.

The folding unit 580 includes a rod 582 having one end inserted into the slide groove 542 of the side link bar 540 to be movable, and the other end hinged to the side bar 560; a slider 584 coupled to a long hole 562 formed in the side bar 560 in the longitudinal direction and to which the other end of the rod 582 is hinged; and an induction link 586 having a long hole 587 of which one end is fitted to an axis pin protruding from an upper surface of the slider 584, and the other end is hinged to the side bar 560.

Figure 11:
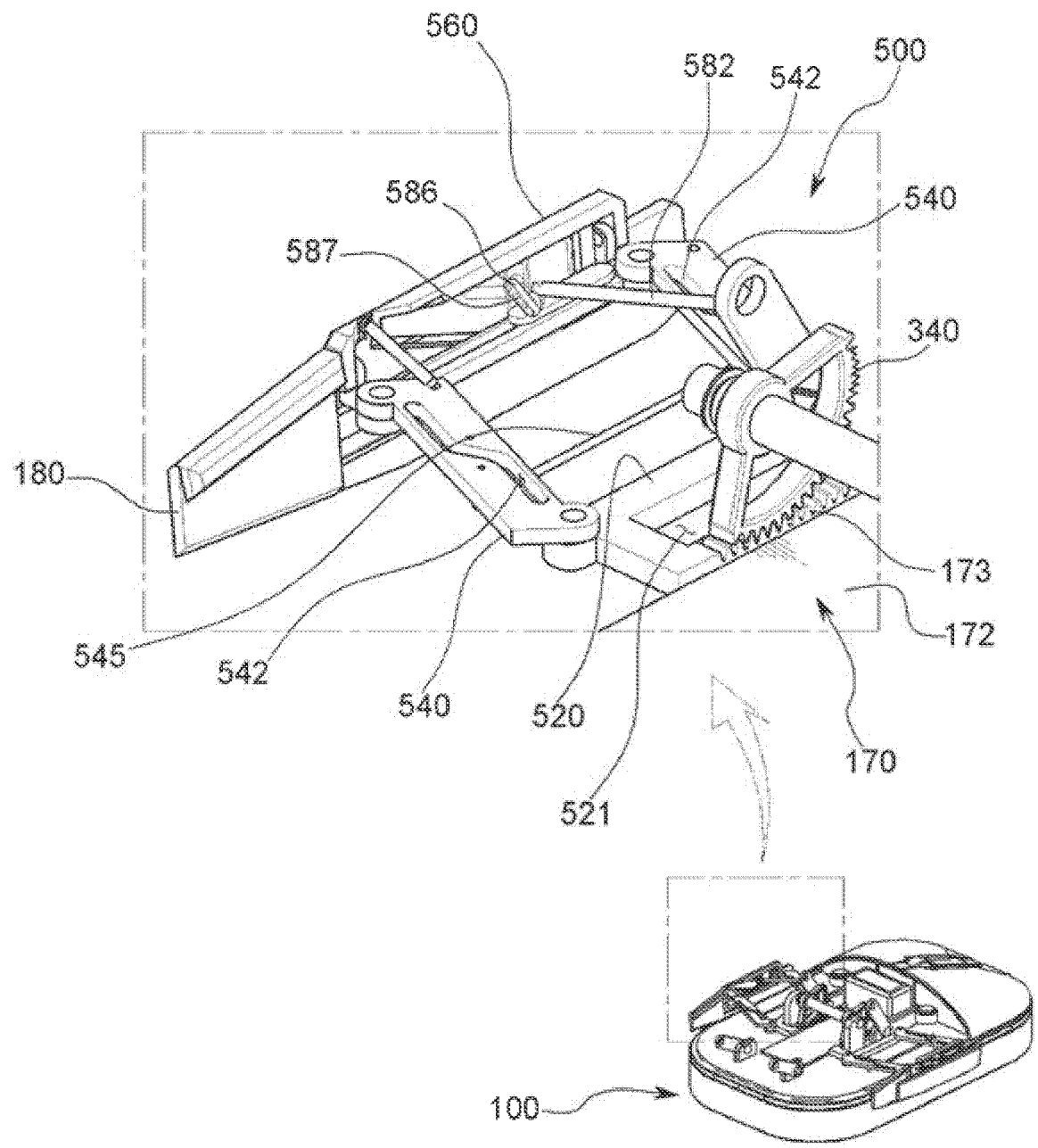

As shown in FIGS. 3, 10 and 11, when the side link bar 540 is deployed, the rod 582 moves along the slide groove 542, and the slider 584 connected to the other end of the rod 582 moves to the right along the long hole 562 of the sidebar 560, and the axis pin of the slider 584 moves along the long hole 587 of the induction link 586 connected to the slider 584, and thus, the sidebar 560 is erected vertically, and the sub-button 180 may be vertically disposed.

Therefore, as shown in FIGS. 3 and 5, when it is necessary to perform an active operation such as a game, a mode is switched to a 'pro mode'.

That is, the cover 140 rises while moving backward, and the sub-buttons 180 are drawn out on the left and right sides respectively. When the mode is switched to the pro mode as described above, a click sound may be generated, and thus, the computer mouse is implemented noisily.

In addition, as the button 120 is opened to both sides, the scroll wheel 130 inside the button 120 is exposed.

The liquid crystal display unit B2 of the box portion B is exposed.

In addition, it is possible to set DPI, on-off of the LED, color, and manipulation functions of the sub-button 180, by manipulating the setting switch 166.

When the sub-button 180 is drawn out, since the computer mouse is operated noisily, a user may feel clicking, and thus, a sense of satisfaction may be given to the user.

Meanwhile, a computer mouse further formed with a cover member so that the above-described computer mouse may be easy to carry and have a beautiful and luxurious appearance will be described. Here, FIGS. 12 to 20 briefly show the computer mouse shown in FIGS. 1 to 11 so that the main technical idea of the present invention may be clearly revealed.

Figure 12:
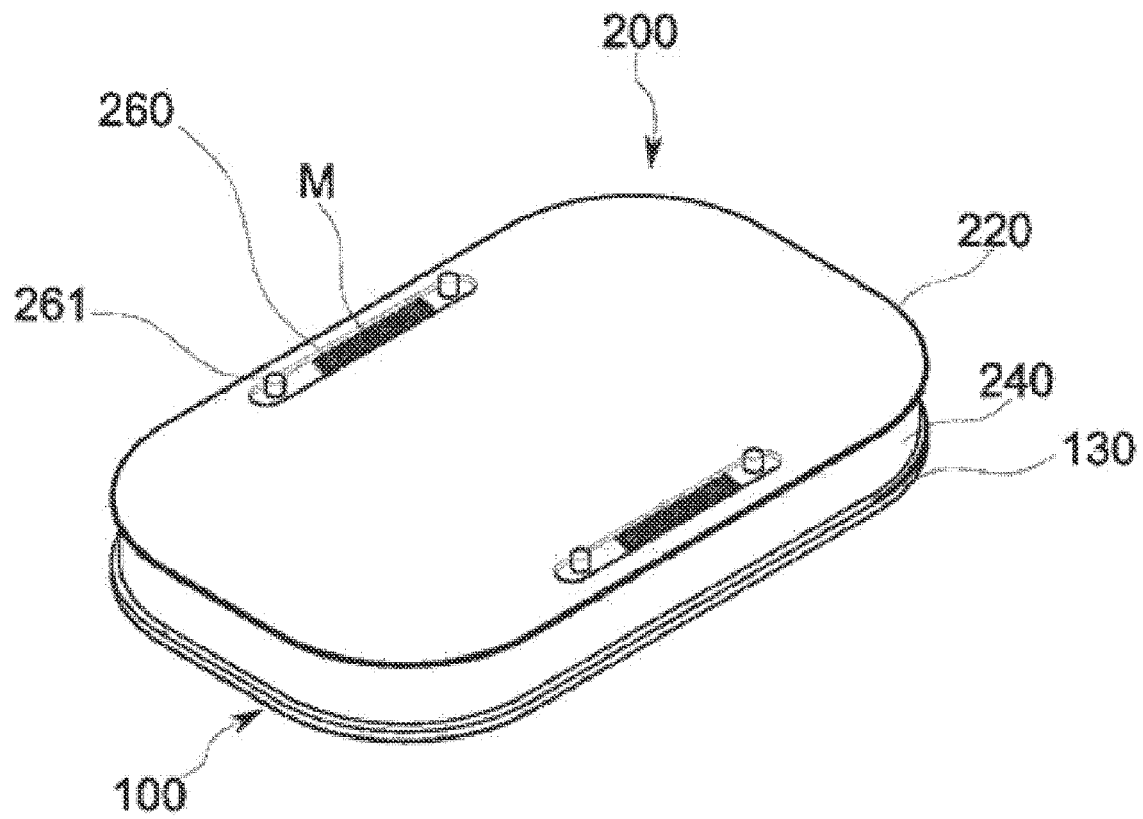
FIG. 12 is a perspective view showing a portable mode of a computer mouse according to the present invention.
Figure 13:
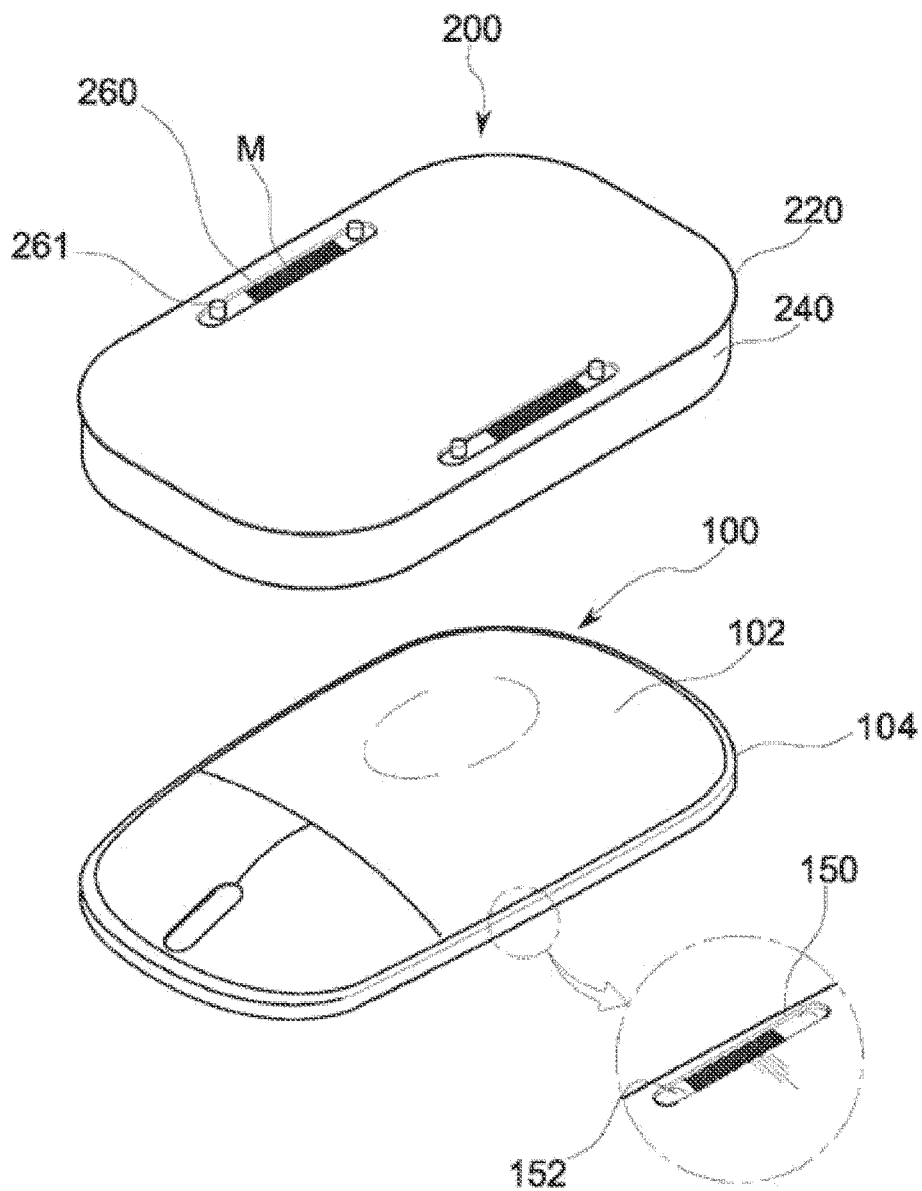
FIG. 13 is an exploded perspective view of a computer mouse according to the present invention.
Figure 14:
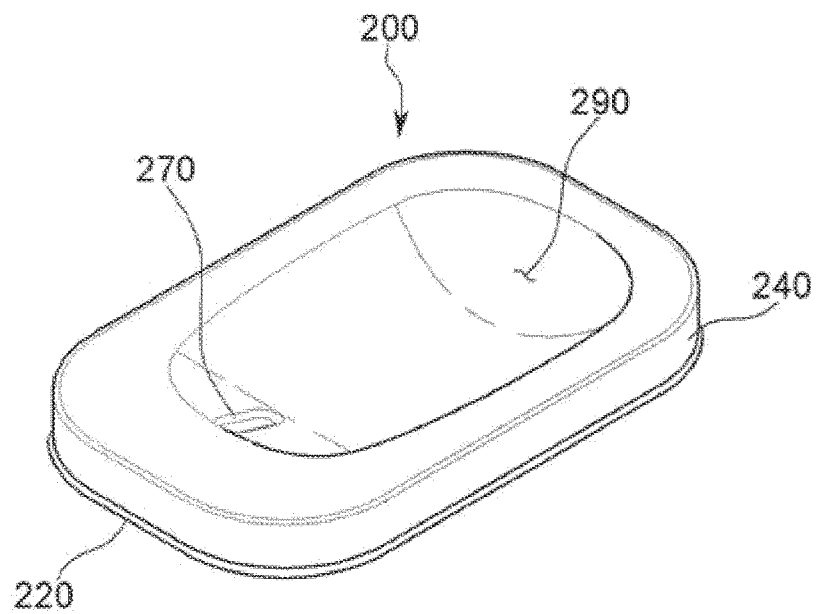
FIG. 14 is a perspective view of an inverted 'cover member' of a computer mouse according to the present invention.
Figure 15:
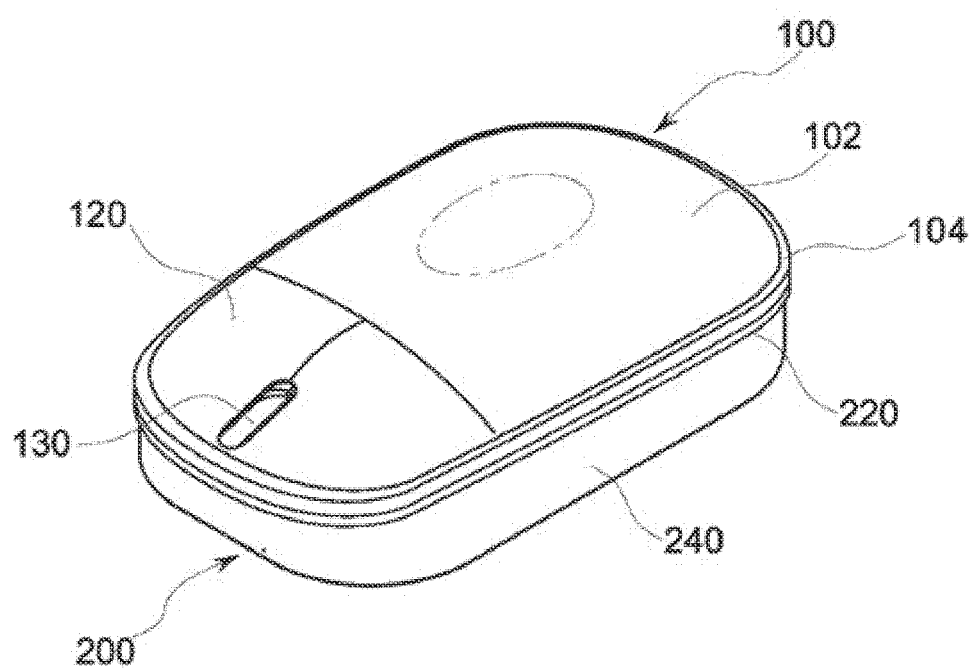
FIG. 15 is a cross-sectional view showing a casual mode in which a cover member of a computer mouse is coupled to a lower portion of a mouse body according to the present invention.
Figure 16:
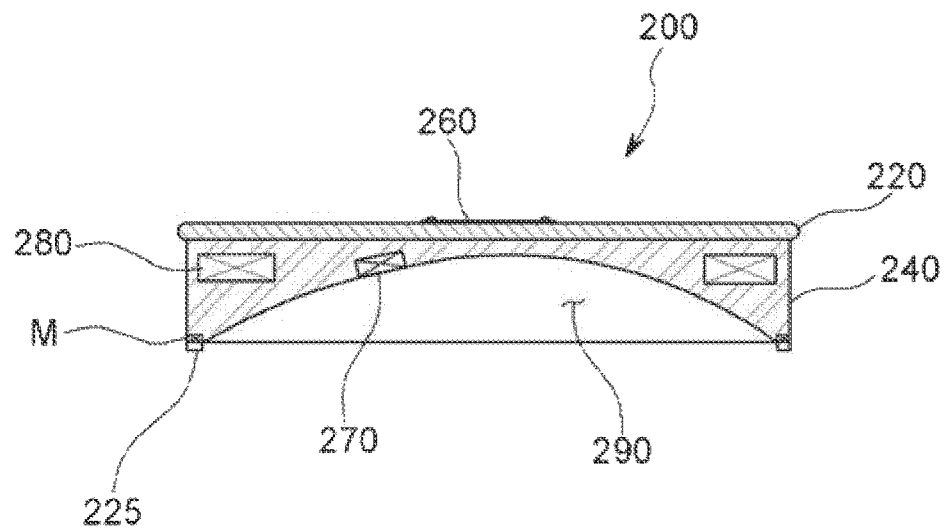
FIG. 16 is a cross-sectional view of a 'cover member' of a computer mouse according to the present invention.

Among the accompanied drawings, FIG. 12 is a perspective view showing a portable mode of a computer mouse according to the present invention, FIG. 13 is an exploded perspective view of a computer mouse according to the present invention, FIG. 14 is a perspective view of an inverted 'cover member' of a computer mouse according to the present invention, FIG. 15 is a cross-sectional view showing a casual mode in which a cover member of a computer mouse is coupled to a lower portion of a mouse body according to the present invention, FIG. 16 is a cross-sectional view of a 'cover member' of a computer mouse according to the present invention, and FIG. 17 to 20 are diagrams sequentially showing modified examples of a computer mouse according to the present invention.

According to the disclosed embodiment, the computer mouse includes a mouse body 100 and a cover member 200 detachably coupled to the mouse body 100.

As shown in FIG. 12, the computer mouse according to the present invention is convenient to carry and includes the mouse body 100 accommodated inside the cover member 200 to protect the mouse body 100 therein, which is referred to as a 'portable mode'.

In the cover member 200, a panel portion 220 in the shape of a flat panel is formed on an upper portion, a side wall 240 is formed on a lower portion along an outer circumferential surface of the panel portion 220, and an insertion groove 290 into which an upper portion of the mouse body 100 is inserted is formed concavely on a lower surface.

The panel portion 220 may be made of a synthetic resin material coated with leather or silicone to improve the quality of the material and improve grip feeling.

Preferably, at least one or more pads 225 may be formed on a lower end of the panel portion 220. The pad 225 allows a lower surface of the cover member 200 to be apart from the ground and prevents excessive slipping, and is made of a Teflon material.

It will not be necessary to be limited to only Teflon material, and it will be natural that the pad 225 may be made of rubber or synthetic resin having elasticity.

Preferably, a mutual coupling means may be included so that the mouse body 100 may be fixed to the panel portion 220 of the cover member 200.

As the coupling means according to an embodiment, a magnetic body M is formed on the panel portion 220 and the side wall 240, and an edge portion 104 made of an iron (Fe) material that is magnetically attached to the magnetic body M is formed on the outer circumferential surface of the mouse body 100 so that the cover member 200 may be coupled to edge portion 104 by magnetic attachment.

A magnetic body (not shown) having a polarity different from that of the magnetic body M of the panel portion 220 may be formed on the edge portion 104.

In the disclosed embodiment, a magnetic body is presented as the coupling means, but it is not necessarily limited thereto, and any means capable of connecting and fixing the cover member 200 to the mouse body 100 may be considered to be included in the concept of the present invention.

On the other hand, an electric conduction means is included to enable electrical signal transmission and power supply between the panel portion 220 and the mouse body 100.

In the electric conduction means according to an embodiment, a first terminal unit 260 is formed in the panel portion 220, and a second terminal unit 150 in contact with the first terminal unit 260 is formed in the lower portion of the mouse body 100 so that a sensor signal and power are supplied.

Referring to FIGS. 14 and 16, in the cover member 200, a sensor 270 is formed in an inner circumferential surface of an insertion groove 290, a power supply unit 280 is formed inside, and the sensor 270 and the first terminal unit 260 are electrically connected so that a signal read from the sensor 270 is transmitted to the first terminal unit 260.

It is preferable that an optical sensor is applied to the sensor 270 and a battery is applied to the power supply unit 280.

Therefore, a position change signal detected by the sensor 270 may be transmitted to the first terminal unit 260, and may be electrically connected through the second terminal unit 150 connected to the first terminal unit 260 and formed in the mouse body 100 so that manipulation signals of the button 120 and the scroll wheel 130 may be transmitted to a computer.

The mouse body 100 includes the plurality of buttons 120 and the body 102 mounted on an upper portion and formed in an arc shape, made of stainless or aluminum, and the touch-responsive scroll wheel 130 is formed between the plurality of buttons 120.

Preferably, a convex protrusion 261 is formed in the first terminal unit 260 and the second terminal unit 150 is formed in a concave recessed portion 152 so that the first terminal unit 260 and the second terminal unit 150 are fitted each other, and thus, a contact state may be stably maintained.

The operation of the present invention configured as described above is described as follows.

Figure 17:
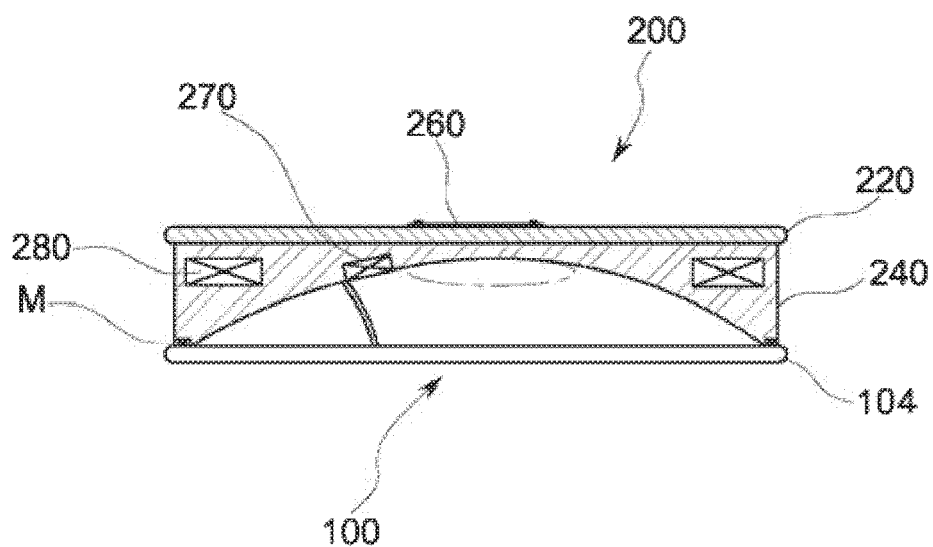
FIGS. 17 to 20 are diagrams sequentially showing modified examples of a computer mouse according to the present invention.
Figure 18:
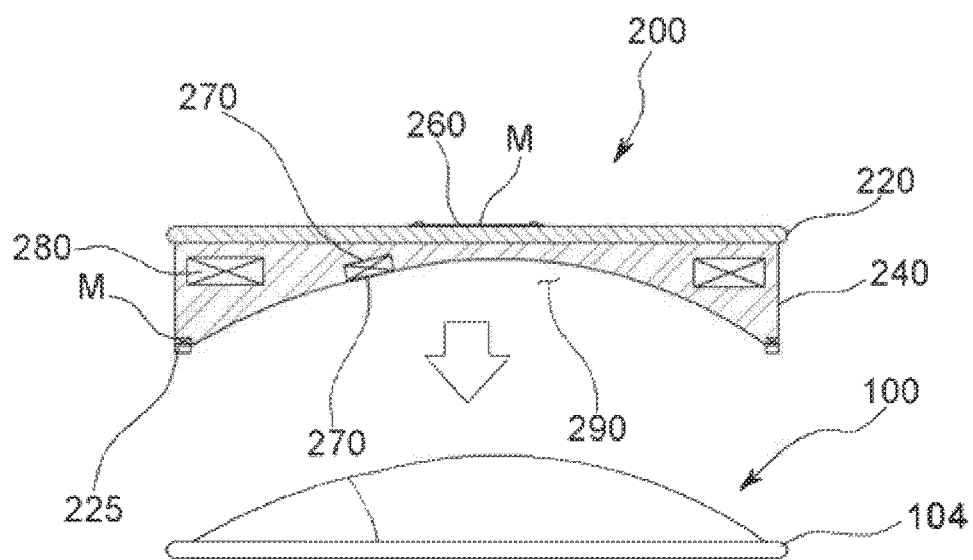
Figure 19:
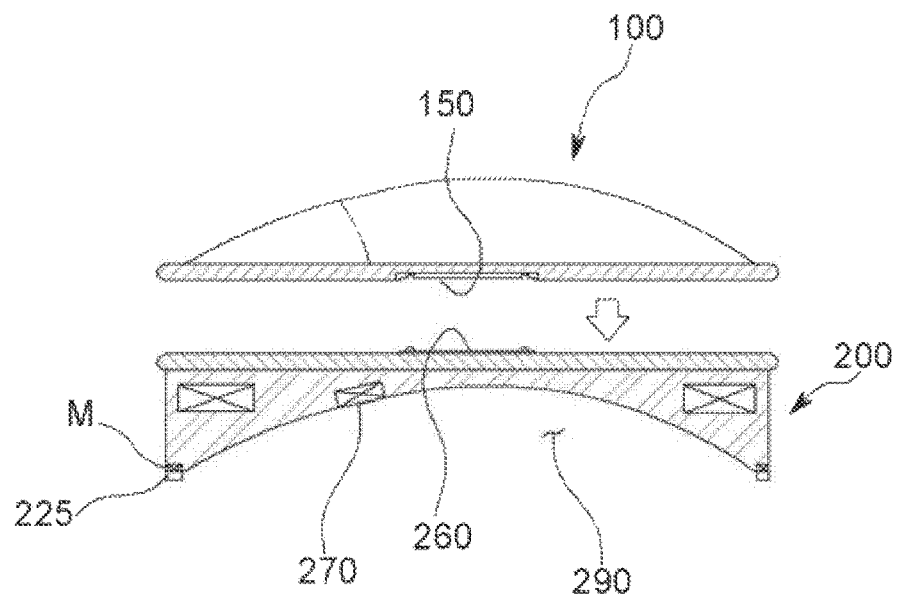
Figure 20:
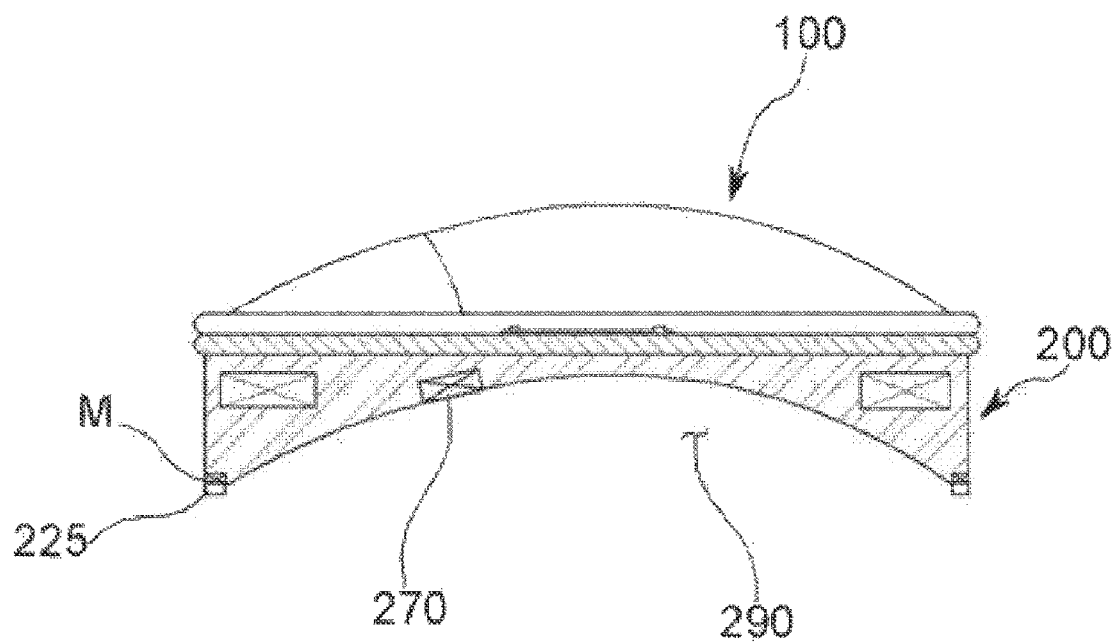

When used in the portable mode, as shown in FIGS. 12 and 17, the cover member 200 is coupled from the upper portion of the mouse body 100 so that the mouse body 100 is inserted into the insertion groove 290.

When coupling is completed, the panel portion 220 of the cover member 200 and the edge portion 104 of the mouse body 100 are coupled by the coupling means. According to an example, the magnetic body M of the panel portion 220 may be magnetically attached to the edge portion 104 to maintain a coupled state.

Thereafter, as shown in FIG. 15, the mode is switched to use the mouse, which is referred to as a 'casual mode'.

The cover member 200 is separated and closely adhered to the lower portion of the mouse body 100.

When the cover member 200 is closely adhered, the magnetic body M of the panel portion 220 of the cover member 200 is magnetically attached to the edge portion 104 of the mouse body 100 so that a fixed state may be maintained.

While the mouse body 100 is gripped by hand, the power is turned on, and it is used after being connected to a computer wirelessly or by wired.

The cover member 200 moves along with the movement of the mouse body 100, the sensor 270 detects a position change according to the movement, transmits the position change to the mouse body 100, and also transmits the position change to the computer to function as an input device.

Although the embodiments of the present invention have been described in more detail with reference to the accompanying drawings, the present invention is not necessarily limited to these embodiments, and may be variously modified and implemented without departing from the technical spirit of the present invention.

What is claimed is:

1. A computer mouse that is easy to carry comprising:
   a mouse body and a cover member detachably coupled to the mouse body;
   wherein, in the cover member, a panel portion is formed on an upper portion, a side wall is formed on a lower portion of the panel portion, and an insertion groove into which an upper portion of the mouse body is inserted is formed concavely on a lower surface;
   a magnetic body is formed on the panel portion;
   an edge portion magnetically attached to the magnetic body is formed on an outer circumferential surface of the mouse body so that the cover member may be coupled to the edge portion by magnetic attachment;
   a first terminal unit is formed in the panel portion;
   a second terminal unit in contact with the first terminal unit is formed in the lower portion of the mouse body so that a sensor signal is transmitted;
   in the cover member, a sensor is formed in an inner circumferential surface of an insertion groove, a power supply unit is formed inside;
   the sensor and the first terminal unit are electrically connected so that a signal read from the sensor is transmitted to the first terminal unit; and
   a convex protrusion is formed in the first terminal unit, and the second terminal unit is formed as a concave recessed portion so that the first terminal unit and the second terminal unit are fitted each other to maintain a contact state.

2. The computer mouse computer mouse that is easy to carry according to claim 1, wherein:
   the mouse body includes:
      a plurality of buttons and a body mounted on an upper portion, formed in an arc shape, and made of stainless or aluminum; and
      a touch-responsive wheel is formed between the plurality of buttons.

* * * * *